United States Patent
Hunt et al.

(10) Patent No.: US 10,235,622 B2
(45) Date of Patent: Mar. 19, 2019

(54) PATTERN IDENTIFIER SYSTEM

(71) Applicant: SAS Institute Inc., Cary, NC (US)

(72) Inventors: Stuart Andrew Hunt, Cary, NC (US); Samuel Paul Leeman-Munk, Cary, NC (US); Richard Welland Crowell, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/658,566

(22) Filed: Jul. 25, 2017

(65) Prior Publication Data

US 2018/0211153 A1    Jul. 26, 2018

Related U.S. Application Data

(60) Provisional application No. 62/450,035, filed on Jan. 24, 2017.

(51) Int. Cl.
*G06N 3/04* (2006.01)
*G06N 3/08* (2006.01)
*G06N 5/04* (2006.01)

(52) U.S. Cl.
CPC ......... *G06N 3/0445* (2013.01); *G06N 3/049* (2013.01); *G06N 3/0454* (2013.01); *G06N 3/08* (2013.01); *G06N 5/047* (2013.01); *G06N 3/084* (2013.01)

(58) Field of Classification Search
USPC .......................................................... 706/18
See application file for complete search history.

(56) References Cited

U.S. PATENT DOCUMENTS

| | | | |
|---|---|---|---|
| 9,552,547 B2* | 1/2017 | Leeman-Munk | G06N 3/08 |
| 9,595,002 B2* | 3/2017 | Leeman-Munk | G06N 3/0445 |
| 9,934,462 B1* | 4/2018 | Healey | G06N 3/04 |
| 10,048,826 B2* | 8/2018 | Leeman-Munk | G06F 9/451 |
| 2003/0190603 A1* | 10/2003 | Larder | G06F 19/18 435/5 |
| 2016/0350646 A1* | 12/2016 | Leeman-Munk | G06N 3/0445 |

(Continued)

OTHER PUBLICATIONS

ScienceDirect Elsevier International Journal of Forecasting vol. 14, Issue 1, Mar. 1, 1998, pp. 35-62 Forecasting with artificial neural networks:: The state of the art, Guoqiang Zhang, B. Eddy Patuwo, Michael Y. Hu.*

ScienceDirect Elsevier Signal Processing Signal Processing vol. 83, Issue 12, Dec. 2003, pp. 2499-2521 Novelty detection: a review—part 2:: neural network based approaches Markos Markou, Sameer Singh.

(Continued)

*Primary Examiner* — Michael B Holmes
(74) *Attorney, Agent, or Firm* — Bell & Manning, LLC

(57) ABSTRACT

A computing device identifies a pattern in a dataset. A first neural network model is executed using data points as input to input nodes of the first neural network model to generate first output node data. A second neural network model is executed using the first output node data as input to input nodes of the second neural network model to generate second output node data. The second output node data includes a plurality of output values for each x-value of the plurality of data points. For each x-value, an output value of the plurality of output values is associated with a single pattern type of a plurality of predefined pattern types. For each pattern type of the plurality of predefined pattern types, a start time and a stop time is identified when the output value for the associated pattern type exceeds a predefined pattern window threshold value.

30 Claims, 7 Drawing Sheets

(56) References Cited

U.S. PATENT DOCUMENTS

| | | | | |
|---|---|---|---|---|
| 2016/0350650 | A1* | 12/2016 | Leeman-Munk | G06N 3/08 |
| 2016/0350652 | A1* | 12/2016 | Min | G06F 17/24 |
| 2018/0095632 | A1* | 4/2018 | Leeman-Munk | G06F 9/451 |
| 2018/0096078 | A1* | 4/2018 | Leeman-Munk | G06F 17/30994 |
| 2018/0096241 | A1* | 4/2018 | Healey | G06N 3/04 |
| 2018/0211153 | A1* | 7/2018 | Hunt | G06N 3/0445 |

OTHER PUBLICATIONS

ScienceDirect Elsevier Neurocomputing vol. 19, Issues 1-3, Apr. 21, 1998, pp. 167-183 Constructive training of probabilistic neural networks Michael R. Berthold a, Jay Diamond b.*

International Journal of Software Engineering and Its Applications vol. 4, No. 2, Apr. 2010 pp. 1-12, Use of Artificial Neural Network in Pattern Recognition Jayanta Kumar Basu, Debnath Bhattacharyya, Tai-hoon Kim.*

Bahdanau et al., Neural Machine Translation by Jointly Learning to Align and Translate, arXiv:1409.0473v7, International Conference on Learning Representations, May 7, 2015.

Krizhevsky et al., ImageNet Classification with Deep Convolutional Neural Networks, Neural Information Processing Systems 2012, Lake Tahoe, Nevada, Dec. 3, 2012.

R. Rojas, The Backpropagation Algorithm, Neural Networks, Springer-Verlag, Berlin, 1996, pp. 151-184.

Collobert et al., A Unified Architecture for Natural Language Processing: Deep Neural Networks with Multitask Learning, Proceedings of the 25th International Conference on Machine Learning, Helsinki, Finland, 2008, pp. 160-167.

* cited by examiner

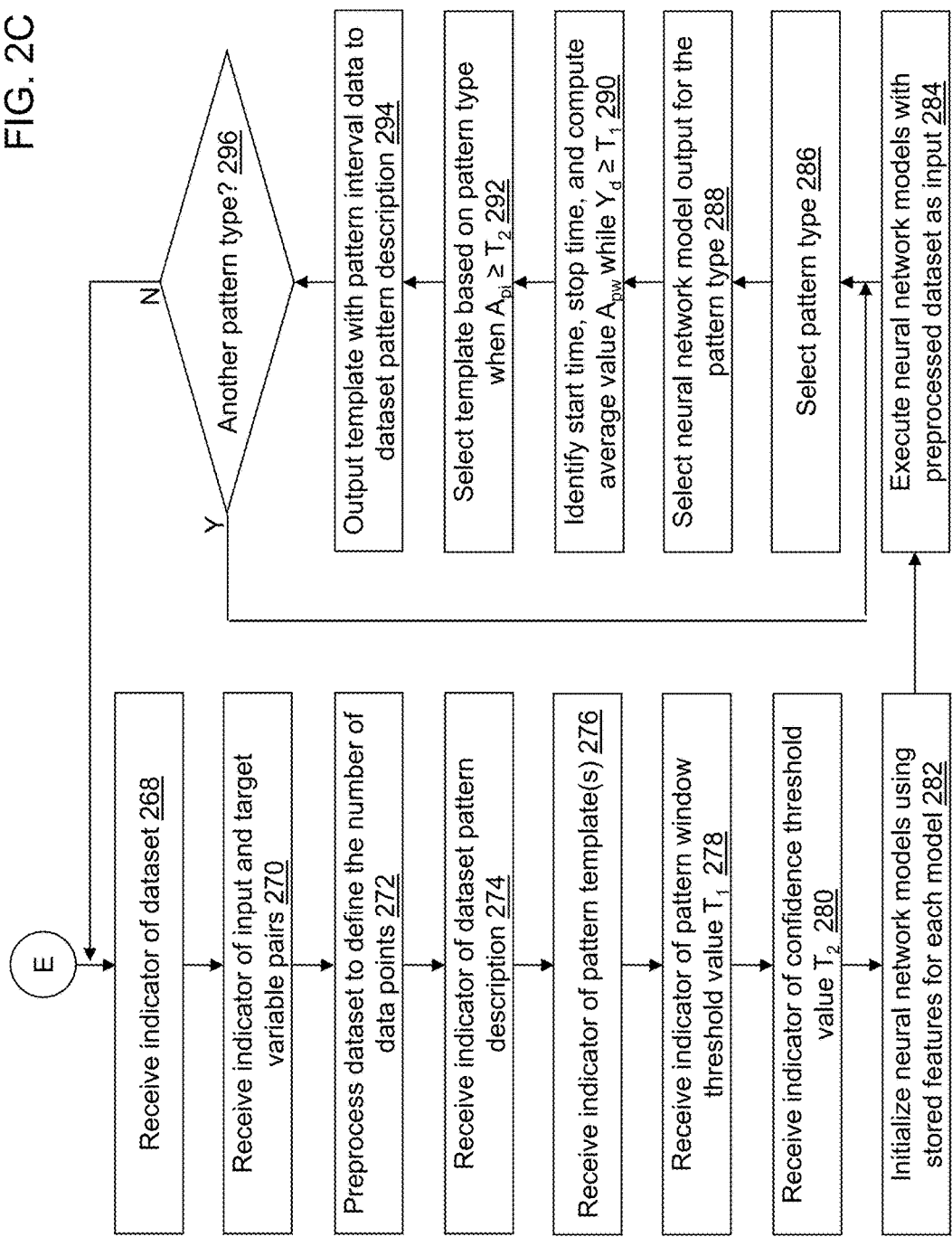

PATTERN IDENTIFIER SYSTEM

CROSS-REFERENCE TO RELATED APPLICATIONS

The present application claims the benefit of 35 U.S.C. § 119(e) to U.S. Provisional Patent Application No. 62/450,035 filed on Jan. 24, 2017, the entire contents of which is hereby incorporated by reference.

BACKGROUND

Machine learning may be used to define models that can be used to identify patterns in various types of data. However, the models may not identify occurrence of multiple patterns at the same data point or multiple patterns of the same type during different intervals.

SUMMARY

In an example embodiment, a non-transitory computer-readable medium is provided having stored thereon computer-readable instructions that, when executed by a computing device, cause the computing device to identify a pattern in a dataset. A first plurality of data points is defined. Each data point of the first plurality of data points includes an x-value and a y-value, wherein a single y-value is defined for each x-value of the first plurality of data points. A first trained neural network model is executed using the first plurality of data points as input to input nodes of the first trained neural network model to generate first output node data from output nodes of the first trained neural network model. A second trained neural network model is executed using the generated first output node data as input to input nodes of the second trained neural network model to generate second output node data from output nodes of the second trained neural network model. The generated second output node data includes a plurality of output values for each x-value of the plurality of data points. For each x-value, an output value of the plurality of output values is associated with a single pattern type of a plurality of predefined pattern types. For each pattern type of the plurality of predefined pattern types, a start time and a stop time is identified when the output value for the associated pattern type exceeds a predefined pattern window threshold value. When the start time and the stop time are identified, the identified start time and stop time are output in association with the associated pattern type.

In yet another example embodiment, a computing device is provided. The system includes, but is not limited to, a processor and a non-transitory computer-readable medium operably coupled to the processor. The computer-readable medium has instructions stored thereon that, when executed by the computing device, cause the computing device to identify the pattern in the dataset.

In an example embodiment, a method of identifying the pattern in the dataset is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 2A, 2B, and 2C depict a flow diagram illustrating examples of operations performed by the pattern identifier device of FIG. 1 in accordance with an illustrative embodiment.

DETAILED DESCRIPTION

Figure 1:
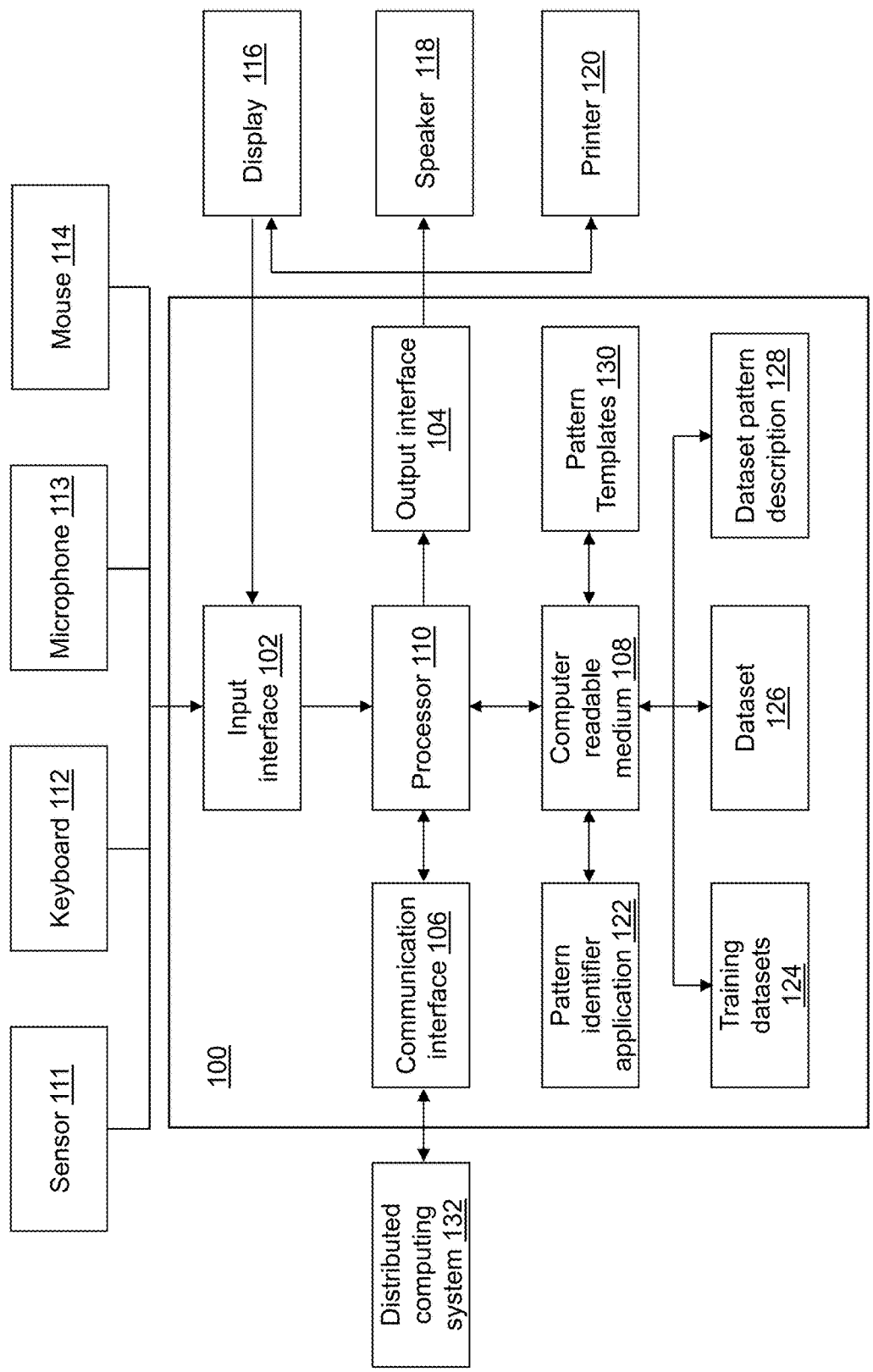
FIG. 1 depicts a block diagram of a pattern identifier device in accordance with an illustrative embodiment.

Referring to FIG. 1, a block diagram of a pattern identifier device 100 is shown in accordance with an illustrative embodiment. Pattern identifier device 100 may include an input interface 102, an output interface 104, a communication interface 106, a non-transitory computer-readable medium 108, a processor 110, a pattern identifier application 122, a training datasets 124, a dataset 126, and dataset pattern description 128, and pattern templates 130. Fewer, different, and/or additional components may be incorporated into pattern identifier device 100.

Input interface 102 provides an interface for receiving information from the user or another device for entry into pattern identifier device 100 as understood by those skilled in the art. Input interface 102 may interface with various input technologies including, but not limited to, a sensor 111, a keyboard 112, a microphone 113, a mouse 114, a display 116, a track ball, a keypad, one or more buttons, etc. to allow information to be entered into pattern identifier device 100 or to allow a user to make selections presented in a user interface displayed on display 116. The same interface may support both input interface 102 and output interface 104. For example, display 116 comprising a touch screen provides a mechanism for user input and for presentation of output to the user. Pattern identifier device 100 may include one or more input interfaces that use the same or a different input interface technology. The input interface technology further may be accessible by pattern identifier device 100 through communication interface 106.

Output interface 104 provides an interface for outputting information for review by a user of pattern identifier device 100 and/or for use by another application or device. For example, output interface 104 may interface with various output technologies including, but not limited to, display 116, a speaker 118, a printer 120, etc. Pattern identifier device 100 may include one or more output interfaces that use the same or a different output interface technology. The output interface technology further may be accessible by pattern identifier device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Pattern identifier device 100 may have one or more communication interfaces that use the same or a different communication interface technology. For example, pattern identifier device 100 may support communication using an Ethernet port, a Bluetooth antenna, a telephone jack, a USB port, etc. Data and messages may be transferred between pattern identifier device 100 and distributed computing system 132 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Pattern identifier device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Pattern identifier device 100 also may include one or more drives that support the loading of a memory media such as a CD, DVD, an external hard drive, etc. One or more external hard drives further may be connected to pattern identifier device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Pattern identifier device 100 may include a plurality of processors that use the same or a different processing technology.

Pattern identifier application 122 performs operations associated with defining dataset pattern description 128 from data stored in dataset 126 after training using training datasets 124. Some or all of the operations described herein may be embodied in pattern identifier application 122.

Referring to the example embodiment of FIG. 1, pattern identifier application 122 is implemented in software (comprised of computer-readable and/or computer-executable instructions) stored in computer-readable medium 108 and accessible by processor 110 for execution of the instructions that embody the operations of pattern identifier application 122. Pattern identifier application 122 may be written using one or more programming languages, assembly languages, scripting languages, etc. Pattern identifier application 122 may be integrated with other analytic tools. As an example, pattern identifier application 122 may be part of an integrated data analytics software application and/or software architecture such as that offered by SAS Institute Inc. of Cary, N.C., USA. For example, pattern identifier application 122 may be implemented using or integrated with SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, pattern identifier application 122 may be implemented using or integrated with one or more SAS software tools such as Base SAS, SAS/STAT®, SAS® High Performance Analytics Server, SAS® LASR™ Analytic Server, SAS® In-Database Products, SAS® Visual Analytics, SAS® Viya™, SAS In-Memory Statistics for Hadoop®, SAS® Enterprise Guide, SAS® Forecast Server, all of which are developed and provided by SAS Institute Inc. of Cary, N.C., USA.

Pattern identifier application 122 is applicable in a variety of industries. For example, pattern identifier application 122 may be used to identify patterns in time series data or any other data with a monotonically increasing variable value. Pattern identifier application 122 may be integrated with other data processing tools to automatically process dataset 126 generated as part of operation of an enterprise, facility, system, device, etc., to identify patterns in dataset 126, and to provide a description of the patterns identified in dataset 126 using input interface 102, output interface 104, and/or communication interface 106 so that appropriate action can be initiated in response to the pattern identification. For example, pattern identifier application 122 may generate a natural language description of dataset 126 indicating, for every moment in time, what patterns are present.

Pattern identifier application 122 may be implemented as a Web application. For example, pattern identifier application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Dataset 126 may include, for example, a plurality of rows and a plurality of columns. The plurality of rows may be referred to as observation vectors or records, and the columns may be referred to as variables. Dataset 126 may be transposed. An observation vector $z_i$ may include a value for each of the plurality of variables associated with the observation i. Each variable of the plurality of variables describes a characteristic of a physical object, such as a living thing, a vehicle, terrain, a computing device, a physical environment, etc. For example, if dataset 126 includes data related to operation of a vehicle, the variables may include an oil pressure, a speed, a gear indicator, a gas tank level, a tire pressure for each tire, an engine temperature, a radiator level, etc. Dataset 126 may include data captured as a function of time for one or more physical objects.

For example, dataset 126 may receive data generated by sensor 111 as a function of time. Sensor 111 may measure a physical quantity in an environment to which sensor 111 is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system.

The data stored in dataset 126 may be received directly or indirectly from the source and may or may not be preprocessed in some manner. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Dataset 126 may be stored on computer-readable medium 108 or on one or more computer-readable media of distributed computing system 132 and accessed by pattern identifier device 100 using communication interface 106, input interface 102, and/or output interface 104. The data stored in dataset 126 may be captured at different date/time points periodically, intermittently, when an event occurs, etc. Each record of dataset 126 may include one or more date values and/or time values.

Dataset 126 may include data captured at a high data rate such as 200 or more observations per second for one or more physical objects. For example, data stored in dataset 126 may be generated as part of the Internet of Things (IoT), where things (e.g., machines, devices, phones, sensors) can be connected to networks and the data from these things collected and processed within the things and/or external to the things before being stored in dataset 126. For example, the IoT can include sensors in many different devices and types of devices. Some of these devices may be referred to as edge devices and may involve edge computing circuitry. These devices may provide a variety of stored or generated data, such as network data or data specific to the network devices themselves. Some data may be processed with an event stream processing engine, which may reside in the cloud or in an edge device before being stored in dataset 126. For example, pattern identifier application 122 may be executed using the event stream processing engine.

Dataset 126 may be stored using one or more of various structures as known to those skilled in the art including one or more files of a file system, a relational database, one or more tables of a system of tables, a structured query language database, etc. on pattern identifier device 100 or on distributed computing system 132. Pattern identifier device 100 may coordinate access to dataset 126 that is distributed across distributed computing system 132 that may include one or more computing devices that can communicate using a network. For example, dataset 126 may be stored in a cube distributed across a grid of computers as understood by a person of skill in the art. As another example, dataset 126 may be stored in a multi-node Hadoop® cluster. For instance, Apache™ Hadoop® is an open-source software framework for distributed computing supported by the Apache Software Foundation. As another example, dataset 126 may be stored in a cloud of computers and accessed using cloud computing technologies, as understood by a person of skill in the art. The SAS® LASR™ Analytic Server may be used as an analytic platform to enable multiple users to concurrently access data stored in dataset 126. The SAS® Viya™ open, cloud-ready, in-memory architecture also may be used as an analytic platform to enable multiple users to concurrently access data stored in dataset 126. Some systems may use SAS In-Memory Statistics for Hadoop® to read big data once and analyze it several times by persisting it in-memory for the entire session. Some systems may be of other types and configurations.

Figure 2A:
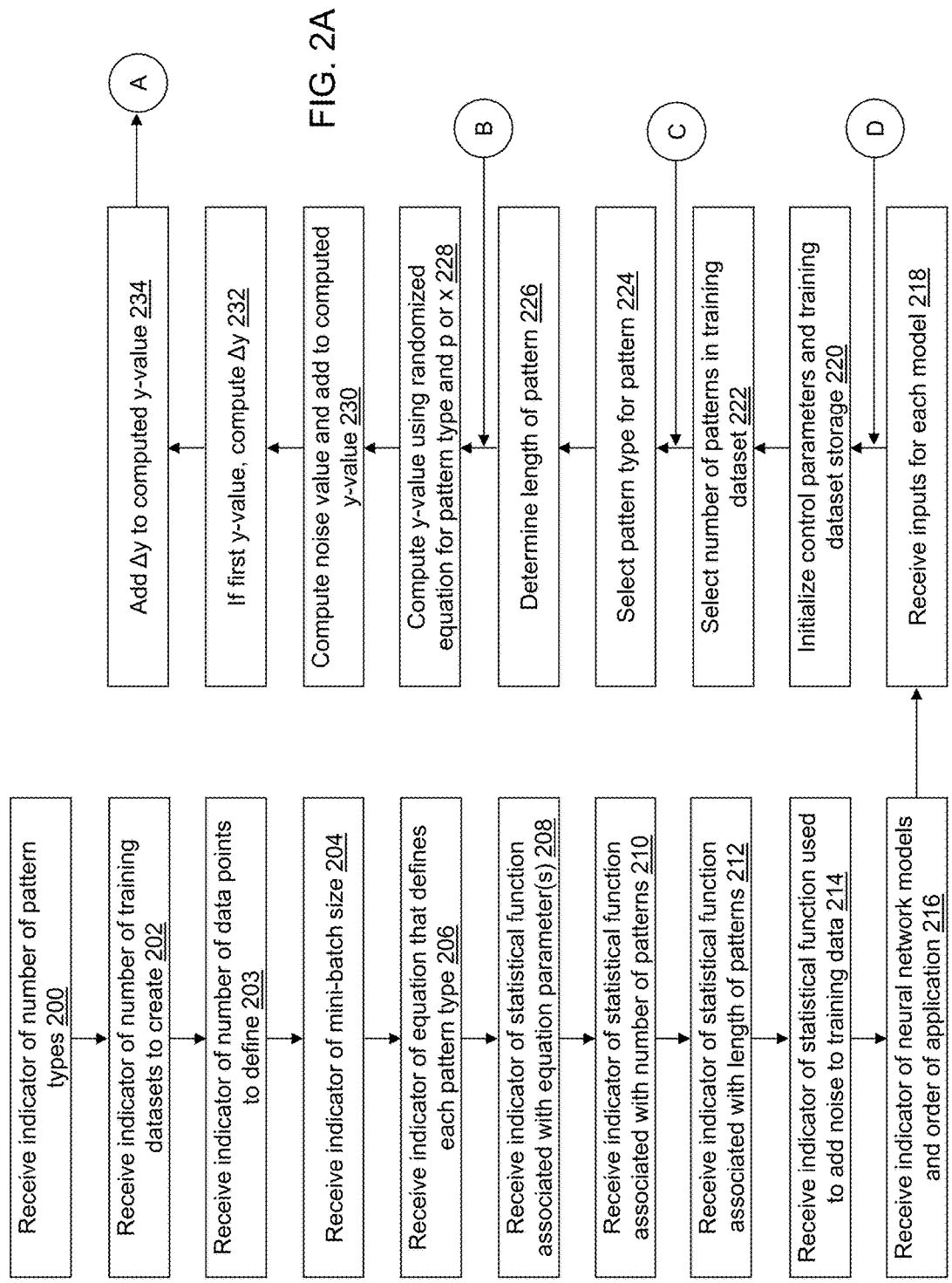
Figure 2B:
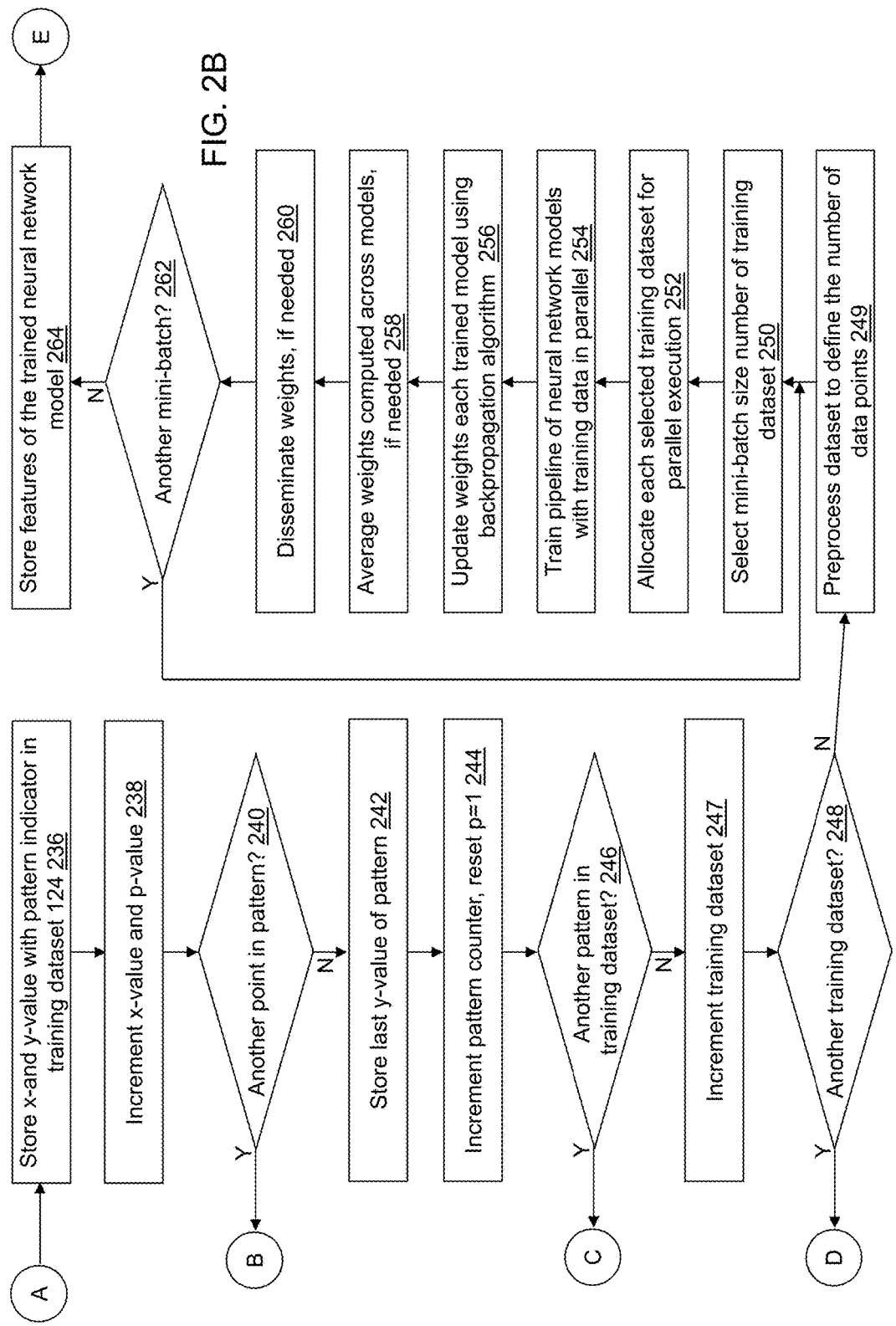

Referring to FIGS. 2A, 2B, and 2C, example operations associated with pattern identifier application 122 are described. Additional, fewer, or different operations may be performed depending on the embodiment of pattern identifier application 122. The order of presentation of the operations of FIGS. 2A, 2B, and 2C is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute pattern identifier application 122, which causes presentation of a first user interface window, which may include a plurality of menus and selectors such as drop down menus, buttons, text boxes, hyperlinks, etc. associated with pattern identifier application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by pattern identifier application 122. The operations of pattern identifier application 122 further may be distributed across a plurality of applications that execute at the same or different computing devices.

Referring to FIG. 2A, in an operation 200, a first indicator of a number of pattern types may be received. For example, a number of pattern types value may be read from a command line that triggers execution of pattern identifier application 122, may be received by pattern identifier application 122 after selection from a user interface window or after entry by a user into a user interface window, or may be received by pattern identifier application 122 by reading the number of pattern types value from a file stored, for example, in computer-readable medium 108. In an alternative embodiment, the first indicator may not be received. For example, a default value for the number of pattern types value may be stored, for example, in computer-readable medium 108 and used automatically. In another alternative embodiment, the value of the number of pattern types value may not be selectable. Instead, a fixed, predefined value may be used.

In an operation 202, a second indicator of a number of training datasets 124 to create may be received. For example, a value for T may be read from a command line that triggers execution of pattern identifier application 122, may be received by pattern identifier application 122 after selection from a user interface window or after entry by a user into a user interface window, or may be received by pattern identifier application 122 by reading the value for T from a file stored, for example, in computer-readable medium 108. The second indicator further may indicate a location and a name to use for each training dataset of training datasets 124. A numeric value may be appended to each name to indicate a specific training dataset of the training datasets 124. In an alternative embodiment, the second indicator may not be received. For example, a default value for T and default values for the location and the name may be stored, for example, in computer-readable medium 108 and used automatically. In another alternative embodiment, the values of T, the location, and the name may not be selectable. Instead, T, the location, and the name have fixed, predefined values. For illustration, T may be selected to be greater than 50.

In an operation 203, a third indicator of a number of data points to define, N, may be received. For example, a value for N may be read from a command line that triggers execution of pattern identifier application 122, may be received by pattern identifier application 122 after selection from a user interface window or after entry by a user into a user interface window, or may be received by pattern identifier application 122 by reading the value for N from a file stored, for example, in computer-readable medium 108. In an alternative embodiment, the third indicator may not be received. For example, a default value for N may be stored, for example, in computer-readable medium 108 and used automatically. In another alternative embodiment, the value of N may not be selectable. Instead, N is a fixed, predefined value.

In an operation 204, a fourth indicator of a mini-batch size, M, may be received. The mini-batch size M defines a number of models that can be trained in parallel as discussed further below. A value for M may be read from a command line that triggers execution of pattern identifier application 122, may be received by pattern identifier application 122 after selection from a user interface window or after entry by a user into a user interface window, or may be received by pattern identifier application 122 by reading the value for M from a file stored, for example, in computer-readable medium 108. In an alternative embodiment, the fourth indicator may not be received. For example, a default value for M may be stored, for example, in computer-readable medium 108 and used automatically. In another alternative embodiment, the value of M may not be selectable. Instead, M is a fixed, predefined value. $1 \leq M \leq N$ though in general M is a divisible factor of N. For example, M=N/10. In an alternative embodiment, the divisible factor may be input and used to compute the mini-batch size M.

Figure 3:
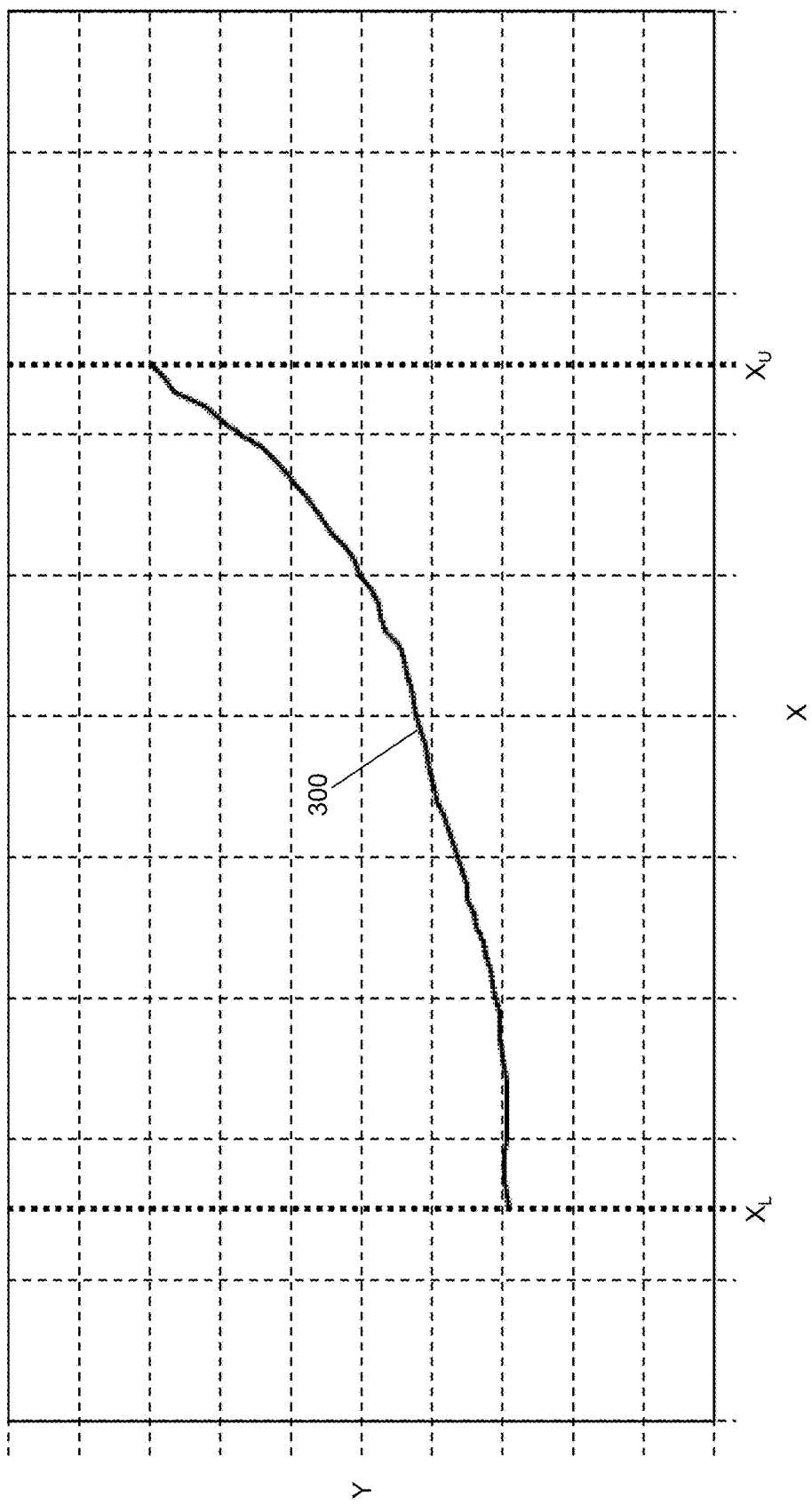
FIG. 3 depicts a pattern to identify by the pattern identifier device of FIG. 1 in accordance with an illustrative embodiment.

In an operation 206, a fifth indicator of an equation that defines each pattern type may be received. An equation may be received by pattern identifier application 122 after selection from a user interface window or after entry by a user into a user interface window, or may be received by pattern identifier application 122 by reading each equation from a file stored, for example, in computer-readable medium 108. Each equation is associated with a different pattern type. In an alternative embodiment, the fifth indicator may not be received. For example, default equations may be stored, for example, in computer-readable medium 108 and used automatically. In another alternative embodiment, the equations may not be selectable. Instead, the equations have predefined characteristics. For illustration, the equation defining each pattern type may be predefined or may be defined using pattern identifier application 122. For example, referring to FIG. 3, pattern identifier application 122 may present a user interface window in which a user can draw a curve 300 that represents a pattern type to add to training datasets 124 or otherwise store for use by pattern identifier application 122. Curve 300 may have any values as long as a single y-value is defined for each x-value of the first plurality of data points. For example, the x-value may represent a time value that is captured during a time window defined between $x_L$ and $x_U$. For example, a y-value may be defined for a predefined number of x-values periodically selected between $x_L$ and $x_U$ with the associated y-value read from curve 300. The x, y pair values defined between $x_L$ and $x_U$ define a first pattern type by fitting a curve to the x, y pair values. A plurality of pattern types may be defined in this manner with the user further selecting or entering an indicator of the pattern type in association with the fit curve.

The equation defining each pattern type may be predefined or may be defined using pattern identifier application 122. For example, referring to FIG. 3, pattern identifier application 122 may present a user interface window in which a user can draw a curve 300 that represents a pattern type to add to training datasets 124 or otherwise store for use by pattern identifier application 122. Curve 300 may have any values as long as a single y-value is defined for each x-value of the first plurality of data points. For example, the x-value may represent a time value that is captured during a time window defined between $x_L$ and $x_U$. For example, a y-value may be defined for a predefined number of x-values periodically selected between $x_L$ and $x_U$ with the associated y-value read from curve 300. The x, y pair values defined between $x_L$ and $x_U$ define a first pattern type by fitting a curve to the x, y pair values. A plurality of pattern types may be defined in this manner with the user further selecting or entering an indicator of the pattern type in association with the fit curve.

In an operation 208, a sixth indicator may be received that indicates a statistical function used to randomly change one or more values of each equation associated with a different pattern type. The same or a different statistical function may be used for each parameter of the equation associated with a pattern type. For example, the sixth indicator indicates a name of a statistical function in association with a parameter of an equation of a pattern type. The sixth indicator may be received by pattern identifier application 122 after selection from a user interface window or after entry by a user into a user interface window. For example, a statistical function may be defined for each pattern type or the same statistical function may be used for each pattern type. A default value for the statistical function may further be stored, for example, in computer-readable medium 108. As an example, a statistical function may be selected from "Gaussian", "Exponential", "Uniform", etc. For example, a default statistical function may be the Gaussian statistical function. Of course, the statistical function may be labeled or selected in a variety of different manners by the user as understood by a person of skill in the art. In an alternative embodiment, the statistical function may not be selectable, and a single statistical function is implemented in pattern identifier application 122. For example, the Gaussian statistical function may be used by default or without allowing a selection. The Gaussian statistical function may be defined by a mean and a standard deviation.

The sixth indicator may further include a statistical function value to use with each statistical function defined for each equation parameter for each pattern type. For example, a maximum value may be received for a Uniform statistical function associated with a slope of a line equation. A plurality of statistical function values may be received. In an alternative embodiment, the sixth indicator may not be received. For example, a default value for the statistical function value may be stored, for example, in computer-readable medium 108 and used automatically. In another alternative embodiment, the statistical function value may not be selectable. Instead, a fixed, predefined value may be used.

For illustration, a user may enter an equation for a line in the user interface window and specify a uniform statistical function for a slope of the line that has a minimum value for the slope and a maximum value for the slope to restrict the line to a certain class of lines such as those with a gradual downward slope, those with a steep downward slope, those with a gradual upward slope, those with a steep upward slope, etc. Each pattern type may be defined in a similar manner with different equations and associated equation parameters, different statistical functions, and/or different statistical function values. Of course, one or more of the equations may be defined with fixed equation parameters.

In an operation 210, a seventh indicator may be received that indicates a statistical function used to randomly select a number of pattern types to include in each training dataset of the training datasets 124. For example, the seventh indicator indicates a name of a statistical function. The seventh indicator may be received by pattern identifier application 122 after selection from a user interface window or after entry by a user into a user interface window. In an alternative embodiment, the statistical function may not be selectable for the number pattern types to include in each training dataset, and a single statistical function is implemented in pattern identifier application 122. For example, the Gaussian statistical function may be used by default or without allowing a selection. The seventh indicator may further or in the alternative include a statistical function value to use with the selected statistical function. In another alternative embodiment, neither the statistical function nor the statistical function value is selectable. Instead, fixed, predefined values are used.

In an operation 212, an eighth indicator may be received that indicates a statistical function used to randomly select a length of each pattern type to include in each training dataset of the training datasets 124. For example, the eighth indicator indicates a name of a statistical function. The eighth indicator may be received by pattern identifier application 122 after selection from a user interface window or after entry by a user into a user interface window. In an alternative embodiment, the statistical function may not be selectable for the length of each pattern type to include in each training dataset, and a single statistical function is implemented in pattern identifier application 122. For example, the Gaussian statistical function may be used by default or without allowing a selection. The eighth indicator may further or in the alternative include a statistical function value to use with the selected statistical function. In another alternative embodiment, neither the statistical function nor the statistical function value is selectable. Instead, fixed, predefined values are used.

In an operation 214, a ninth indicator of a statistical function used to add noise to the data included in each training data set of the training datasets 124 may be received. For example, the ninth indicator indicates a name of a statistical function. The ninth indicator may be received by pattern identifier application 122 after selection from a user interface window or after entry by a user into a user interface window. A statistical function may be defined for one or more of the pattern types. For example, a statistical function may be defined for each pattern type or the same statistical function may be used for all pattern types. A default value for the statistical function may further be stored, for example, in computer-readable medium 108. As an example, a statistical function may be selected from "Gaussian", "Exponential", "Uniform", "Momentum Noise Generator", "Gaussian+Noise", "Exponential+Noise", "Uniform+Noise", etc. For example, a default statistical function may be the Gaussian statistical function. Of course, the statistical function may be labeled or selected in a variety of different manners by the user as understood by a person of skill in the art. In an alternative embodiment, the statistical function may not be selectable, and a single statistical function is implemented in pattern identifier application 122. For example, the Gaussian statistical function may be used by default or without allowing a selection.

For illustration, the Momentum Noise Generator statistical function computes an accumulated noise value. For example, for each iteration as discussed further below, the Momentum Noise Generator statistical function may compute the accumulated noise value using noise=0.9*noise+0.1*random( ) which causes it to gradually change. The ninth indicator may further, or in the alternative, include a statistical function value to use with the selected statistical function. For example, the values of "0.9" and "0.1" may be statistical function values that are also received with the ninth indicator. In another alternative embodiment, neither the statistical function nor the statistical function value is selectable. Instead, fixed, predefined values are used.

In an operation 216, a tenth indicator of a plurality of neural network models may be received. For example, the tenth indicator indicates a plurality of neural network models with a name of each model listed in an order of application. The tenth indicator may be received by pattern identifier application 122 after selection from a user interface window or after entry by a user into a user interface window. The plurality of neural network models forms a pipeline of models that input from one to the next in series. For example, the plurality of neural network models may be based on three model types, an N-layer, bi-directional, recurrent neural network (RNN) model type, an N-layer RNN model type, and an N-layer convolutional network model type, that may be composed in any order and repeated as indicated by the tenth indicator.

For illustration, the tenth indicator may include 3-layer, bi-directional, RNN, 4-layer convolutional network, and 1-layer RNN. The plurality of neural network models form a composite model defined by each connected model type. The 3-layer, bi-directional RNN followed by a single-layer RNN is the same as having a first single-layer, bi-directional RNN, followed by a second single-layer, bi-directional RNN, followed by a third single-layer, bi-directional RNN, followed by a single-layer RNN. Having an N-layer model means having N of those models composed together, in a line, with the output of one feeding into the input of the next.

A default plurality of neural network models may be indicated by "Single Layer, Bi-directional RNN" and "Single Layer RNN". As another example, a default plurality of neural network models may be indicated by "Single Layer Convolutional Network" and "Four Layer RNN". Of course, the plurality of neural network models may be labeled or selected in a variety of different manners by the user as understood by a person of skill in the art.

In an alternative embodiment, the plurality of neural network models may not be selectable, and a single plurality of neural network models is implemented by pattern identifier application 122. For example, the plurality of neural network models indicated as Single Layer, Bi-directional RNN" and "Single Layer RNN" may be used by default or without allowing a selection.

In an operation 218, an eleventh indicator of a neural network model value to use with each neural network model of the plurality of neural network models may be received. The eleventh indicator may include one or more neural network model values for each neural network model selected. The neural network model value(s) for each neural network model selected may be referred to herein as a hyperparameter value. For example, each neural network and convolutional network model includes a neural network model value that defines a number of layers value.

Each RNN model further includes an in_height parameter value and an out_height parameter value as described further below. Each convolutional network model further includes the in_height parameter value, the out_height parameter value, and a filter_width parameter value. The filter_width parameter value defines how much the convolutional network model can see left and right. If it can see+/−2 units along the x-axis, it has filter_width parameter value equal to 5 because it looks at relative positions [−2, −1, +0, +1, +2].

In an alternative embodiment, the eleventh indicator may not be received. For example, a default value for the neural network model value(s) may be stored, for example, in computer-readable medium 108 and used automatically. In another alternative embodiment, the neural network model value(s) may not be selectable. Instead, fixed, predefined value(s) may be used.

In operations 220 to 249, training datasets 124 are created. In an operation 220, control parameters and training dataset storage are initialized or re-initialized on a next iteration of operation 220. For example, a training dataset of the training datasets 124 is created and opened as a current training dataset. For example, a file named training_dataset_1 is created on a first iteration of operation 220; a file named training_dataset_2 is created on a second iteration of operation 220; etc. A Δy value may be initialized to zero, a pattern counter may be initialized to one, an x-value may be initialized to one, and a p-value may be initialized to one; and a training dataset counter may be initialized to one.

In an operation 222, a number of patterns to create in the current training dataset is selected by computing a value using the statistical function and the statistical function values defined by operation 210.

In an operation 224, a pattern type for a pattern associated with the pattern counter is selected, for example, by computing a pattern type index using a Uniform statistical function that selects a value between one and the number of pattern types defined by operation 210.

In an operation 226, a length of the selected pattern type is selected by computing a value using the statistical function and the statistical function values defined by operation 212.

In an operation 228, a y-value for the current x-value and the current p-value is selected by computing a value using the equation defined by operation 212 for the selected pattern type and the statistical function and the statistical function values defined by operation 208.

In an operation 230, a noise value for the current x-value and the current p-value is selected by computing a value using the statistical function and the statistical function values defined by operation 214. The noise value is added to the y-value.

In an operation 232, if this is the first y-value for a new pattern type and not the first pattern in the current training dataset, the Δy value is computed as a difference between the last y-value of the previous pattern and the y-value computed in operation 230. The Δy value is a vertical offset between the patterns.

In an operation 234, the Δy value is added to the y-value so that the patterns are continuous.

Referring to FIG. 2B, in an operation 236, the x-value and the y-value are stored with an indicator of the pattern type in the current training dataset. For example, the indicator of the pattern type may be a text or integer value that is associated with a specific pattern type of the plurality of pattern types.

In an operation 238, the current x-value and the current p-value are each incremented by one.

In an operation 240, a determination is made concerning whether or not there is another point to include in the current pattern based on the current p-value and the length of the selected pattern type determined by operation 226. When there is another point to include in the current pattern, processing continues in operation 228 to compute a next y-value. When there is not another point to include in the current pattern, processing continues in an operation 242.

In operation 242, the last y-value of the current pattern is stored for use in computing the Δy value for the next pattern in operation 232.

In an operation 244, the pattern counter is incremented and the p-value is reinitialized to one for the next pattern.

In an operation 246, a determination is made concerning whether or not there is another pattern to include in the current training dataset based on the pattern counter and the selected number of patterns determined by operation 222. When there is another pattern to include in the current training dataset, processing continues in operation 224 to select a next pattern type. When there is not another pattern to include in the current training dataset, processing continues in an operation 247. The next pattern type cannot be the same as the current pattern type, but the same pattern type can be selected multiple times for inclusion in the current training dataset.

In operation 247, the training dataset counter is incremented by one.

In an operation 248, a determination is made concerning whether or not there is another training dataset of the training datasets 124 to create based on the training dataset counter and the number of training datasets to create determined by operation 202. When there is another training dataset to create, processing continues in operation 220 to create a next training dataset. When there is not another training dataset to create, processing continues in an operation 249.

In operation 249, each training dataset is preprocessed to include N x-values that increment from one to N. For example, a sampling interval may be computed based on $s=(X_{max}-X_{min})/(N-1)$, where s is a sampling interval, $X_{max}$ is a maximum value of the x-values, $X_{min}$ is a minimum value of the x-values, and N is N the number of data points to define. Interpolation, such as linear interpolation, may be used to compute the y-value bounded by successive sampling intervals of the x-value. Of course, other types of interpolation may be used that may be user definable in a manner similar to that described for the statistical function.

Similar to dataset 126, training datasets 124 may be stored on computer-readable medium 108 or on one or more computer-readable media of distributed computing system 132 and accessed by pattern identifier device 100 using communication interface 106, input interface 102, and/or output interface 104. Training datasets 124 further may be stored using one or more of various structures as known to those skilled in the art including one or more files of a file system, a relational database, one or more tables of a system of tables, a structured query language database, etc. on pattern identifier device 100 or on distributed computing system 132.

In an operation 250, a set of training datasets is selected from training datasets 124 without replacement on a next iteration of operation 250, for example, using a uniform statistical function selecting between 1 and T. The set of training datasets includes M, the mini-batch size, number of training datasets. The mini-batch size M may be equal to one.

In an operation 252, each training dataset of the selected set of training datasets is allocated to a computing device of distributed computing system 132 and/or a different thread of pattern identifier device 100 for parallel execution. As a result, the mini-batch size M defines a number of parallel executions.

In an operation 254, the plurality of neural network models is executed in parallel with the allocated training dataset. For example, the plurality of neural network models are instantiated for execution on each computing device of distributed computing system 132 and/or a different thread of pattern identifier device 100. The allocated training dataset is input to the first neural network model that may be a bi-directional, RNN model, an RNN model, or a convolutional network model. The output of the first neural network model is input to a next neural network model of the pipeline, and so on, until the last model in the pipeline generates an output that has a width equal to the number of pattern types. Weights are computed for each node of the pipeline formed by the plurality of neural network models.

For example, the first neural network model is trained using the allocated training dataset as an input. Execution of the first neural network model generates first output node data from output nodes of the first neural network model that are input to the second neural network model that is trained using the first output node data as input. Execution of the second neural network model generates second output node data from output nodes of the second neural network model, and so on. As a result, the plurality of neural network models are trained as a collective single model.

For illustration, if the plurality of neural network models include models A, B, and C, where model A feeds into model B, which feeds into model C, the in_height parameter value for model A is equal to one because the input data for the plurality of neural network models is represented as a one-dimensional array. An index into the one-dimensional array represents an x-value. The x-values are 1 to N, the number of data points to define. Each value associated with the index represents a y-value at that location computed when defining the allocated training dataset. The out_height parameter value for model A is equal to the in_height parameter value for model B, and the out_height parameter value for model B is equal to the in_height parameter value for model C, where models A, B, and C can be any neural network model type.

After passing through model A, the data has a height defined by the out_height parameter value for model A. The height is arbitrary and meaningless in the same sense that hidden neurons in a feed-forward neural network are arbitrary in number and have no definite meaning. In the same way, the height at any inner model of the plurality of neural network models is arbitrary and meaningless. The difference between a hidden layer of neurons in a simple feed-forward neural network, and the inner models is extra dimensionality. Instead of having a column of neuron-outputs from any inner model, there is a matrix of outputs. The data from any inner model of the plurality of neural network models has a width that is constant and meaningful: each column represents data for a specific x-value. Like a neural network hidden layer, the height of that column is based on the out_height parameter value of that model.

At the end, the final model has an out_height parameter value equal to the number of pattern types defined in operation 200. This final model is responsible for transforming the hidden layers/hidden knowledge into values that represent whether or not a certain pattern is present.

In an operation 256, a backpropagation algorithm is executed to update the weights. For illustration, the backpropagation algorithm looks for a minimum of an error function in weight space using a method of gradient descent. The combination of weights that minimize the error function is used to update the weights for each node of the pipeline formed by the plurality of neural network models. For further details, see Chapter 7 of R. Rojas, Neural Networks, 151-184 (Springer-Verlag, Berlin, 1996). When backpropagation is performed, the loss or error that is propagating backwards simply flows from one model to the next. Once the error has propagated through the entire plurality of neural network models, the gradient is obtained and applied to all parts of all of the plurality of neural network models simultaneously. For example, when the plurality of neural network models includes four stacked bi-directional, RNN models, followed by five stacked convolutional network models, followed by a final single layer RNN model, as data from each layer of the bi-directional, RNN models is input to the next layer, data is also input from all of the stacked bi-directional, RNN models to the stacked convolutional network models, and so on. The backpropagated loss trickles through in the same way, but in reverse.

In an operation 258, an average weight is computed for each node of the pipeline from each parallel execution. Of course, if the mini-batch size M=1, there is no parallel execution so the average weight is not computed.

In an operation 260, the computed average weight for each node of the pipeline is disseminated to each computing device of distributed computing system 132 and/or a different thread of pattern identifier device 100 for the next iteration of a mini-batch of training datasets. Of course, if the mini-batch size M=1, there is no parallel execution so the average weights are not disseminated.

In an operation 262, a determination is made concerning whether or not there is another mini-batch of training datasets of the training datasets 124 to train the plurality of neural network models. When there is another mini-batch, processing continues in operation 250 to select a next set of training datasets. When there is not another mini-batch, processing continues in an operation 264. Operation 260 may be performed after operation 262 and before continuing in operation 250. When the mini-batch size M=1, each training dataset of the training datasets 124 is executed individually.

In an operation 264, the features that describe the trained plurality of neural network models are stored, for example, in computer-readable medium 108. The hyperparameters that describe each model of the plurality of neural network models as well as the order is also stored in a file or other data structure or in-memory if subsequent execution is performed by pattern identifier device 100. For example, a 3-layer, bi-directional RNN followed by a single-layer RNN stores the fact that its architecture is a first bi-directional RNN model, followed by a second bi-directional RNN model, followed by a third bi-directional RNN model, followed by an RNN model. The hyperparameters and data for each model are stored. For each convolutional network model, a tensor of dimension [filter_width, in_height, out_height] is stored.

For each RNN, three weight matrices of dimension (out_height)×(in_height+out_height) are stored. The weight matrix is not of dimension out_height×in_height because the RNN takes its previous output (from X−1) as an input, which allows it to remember things because it reads its own output each iteration. The previous output and current input are concatenated as the input to the RNN each iteration.

When a bi-directional RNN model feeds into another bi-directional RNN model, two (out_height/2×width) matrices of data are stored: one for the forward RNN model, and one for the backward RNN model. For the next bi-directional RNN model, the next forward RNN model receives the matrix from the previous forward RNN model, and the next backward RNN model receives the matrix from the previous backward RNN model.

When a bi-directional RNN model feeds into a non bi-directional RNN model, the two (out_height/2×width) matrices are concatenated together along the height axis, forming a (out_height×width) matrix, which is what the other models are expecting.

In summary, the forward RNN model data and backward RNN model data are kept separate while data goes through the N-layer, bi-directional RNN models. Once it goes to any other model type, the data is concatenated together and put back into the typical (out_height×width) matrix format.

For each bi-directional RNN model, six weight matrices of dimension (out_height/2)×(in_height+out_height/2) are stored because a bi-directional RNN model is two RNNs model. The out_height is halved for each bi-directional RNN model because when a bi-directional RNN model is fed into any non bi-directional RNN model, the two RNN outputs are concatenated together along the height axis.

Figure 4:
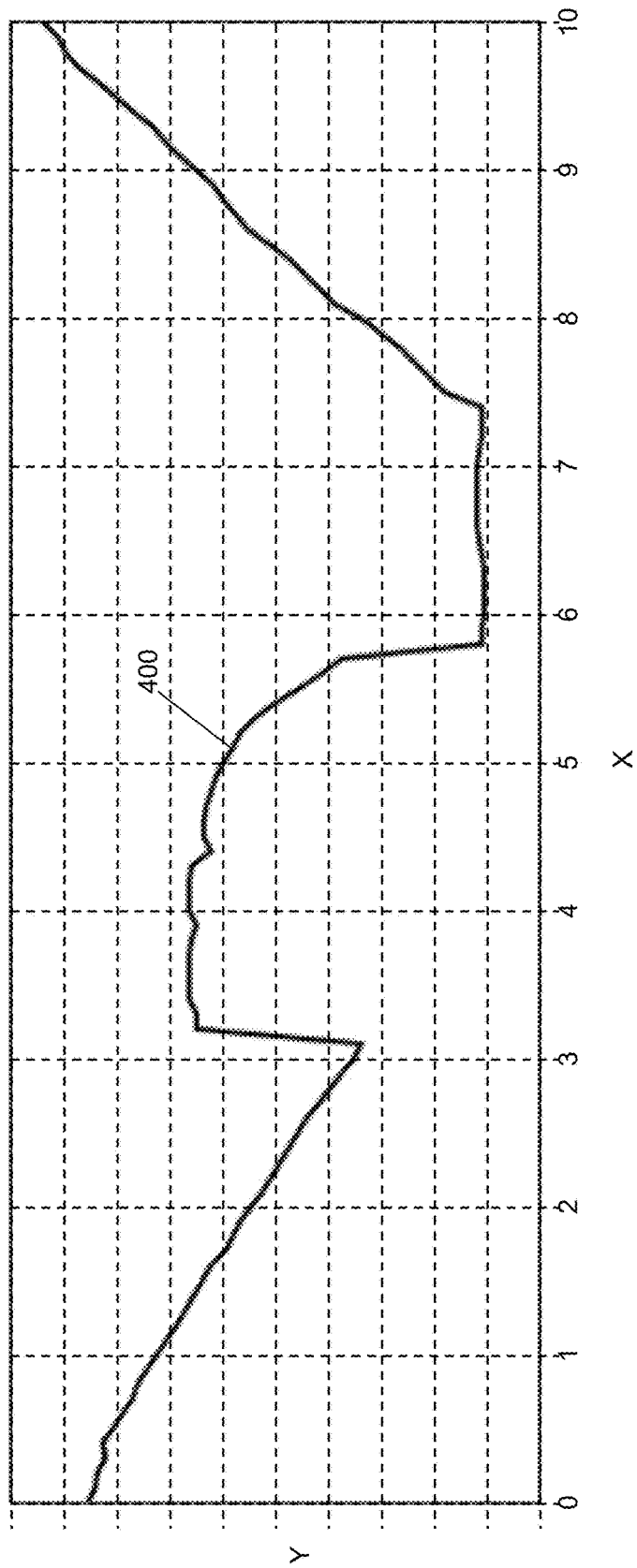
FIG. 4 depicts data in which to identify one or more patterns in accordance with an illustrative embodiment.

Referring to FIG. 2C, in an operation 268, a twelfth indicator may be received that indicates dataset 126. For example, the twelfth indicator indicates a location and a name of dataset 126. As an example, the twelfth indicator may be received by pattern identifier application 122 after selection from a user interface window or after entry by a user into a user interface window. In an alternative embodiment, dataset 126 may not be selectable. For example, a most recently created dataset may be used automatically. Referring to FIG. 4, dataset curve 400 shows a graph of an example dataset 126. Dataset curve 400 further may represent a graph of an example training dataset 126 of the training datasets 124.

Referring again to FIG. 2C, in an operation 270, a thirteenth indicator may be received that indicates the x, y pairs included in dataset 126 for which identification of patterns is to be performed. For example, the thirteenth indicator may indicate a list of pairs of column numbers. As another option, a first column of dataset 126 may be assumed to be the x column, and a second column of dataset 126 may be assumed to be the y column.

In an operation 272, dataset 126 is pre-processed to define the number of data points, N, indicated by the third indicator in operation 203 if not all of the data points included in dataset 126 are used. Pre-processing dataset 126 to have the same number of data points as the noised training datasets 124 may reduce the training time and improve the performance of pattern identified application 122. Merely for illustration, the number of data points to define, N, indicated in operation 203 may be 101 though any number within reason can be equally effective for this purpose. Smaller values may provide less information to the plurality of neural network models, while larger values may increase a computational complexity and execution time of the plurality of neural network models.

For example, a sampling interval may be computed based on $s=(X_{max}-X_{min})/(N-1)$, where s is the sampling interval, $X_{max}$ is a maximum value of the x-values of dataset 126, $X_{min}$ is a minimum value of the x-values of dataset 126, and N is the number of data points to define. Interpolation, such as linear interpolation, may be used to compute the y-value bounded by successive sampling intervals. Of course, other types of interpolation may be used that may be user definable in a manner similar to that described for the statistical functions.

In an operation 274, a fourteenth indicator may be received that indicates dataset pattern description 128. For example, the fourteenth indicator indicates a location and a name of dataset pattern description 128. As an example, the fourteenth indicator may be received by pattern identifier application 122 after selection from a user interface window or after entry by a user into a user interface window. In an alternative embodiment, dataset pattern description 128 may not be selectable. For example, a default location and name of dataset pattern description 128 may be used automatically.

In an operation 276, a fifteenth indicator may be received that indicates one or more pattern templates for each pattern type. For example, the fifteenth indicator indicates a location and a name of pattern templates 130. As an example, the fifteenth indicator may be received by pattern identifier application 122 after selection from a user interface window or after entry by a user into a user interface window. In an alternative embodiment, pattern templates 130 may not be selectable. For example, a default location and name of pattern templates 130 may be used automatically.

Each pattern template describes characteristics of an associated pattern type. For example, for an exponential curve type pattern type, the pattern template may recite "There is an exponential increase from $x_1$ to $x_2$", where $x_1$ and $x_2$ are defined by pattern identifier application 122 as described further below. A plurality of pattern templates may be defined for each pattern type. For example, when a plurality of pattern templates are defined for each pattern type, a template threshold value may be defined for each pattern template. For example, a template threshold value of 0.75 may be associated with the template pattern "There is a strong exponential increase from $x_1$ to $x_2$"; whereas, a template threshold value of 0.5 may be associated with the template pattern "There is an exponential increase from $x_1$ to $x_2$", whereas, a template threshold value of 0.25 may be associated with the template pattern "There is a possible exponential increase from $x_1$ to $x_2$".

In an operation 278, a sixteenth indicator of a pattern window threshold value $T_1$ may be received. For example, a value for $T_1$ may be read from a command line that triggers execution of pattern identifier application 122, may be received by pattern identifier application 122 after selection from a user interface window or after entry by a user into a user interface window, or may be received by pattern identifier application 122 by reading $T_1$ from a file stored, for example, in computer-readable medium 108. In an alternative embodiment, the sixteenth indicator may not be received. For example, a default value for $T_1$ may be stored, for example, in computer-readable medium 108 and used automatically. In another alternative embodiment, the value of $T_1$ may not be selectable. Instead, a fixed, predefined value may be used.

In an operation 280, a seventeenth indicator of a confidence threshold value $T_2$ may be received. For example, a value for $T_2$ may be read from a command line that triggers execution of pattern identifier application 122, may be received by pattern identifier application 122 after selection from a user interface window or after entry by a user into a user interface window, or may be received by pattern identifier application 122 by reading $T_2$ from a file stored, for example, in computer-readable medium 108. In an alternative embodiment, the seventeenth indicator may not be received. For example, a default value for $T_2$ may be stored, for example, in computer-readable medium 108 and used automatically. In another alternative embodiment, the value of $T_2$ may not be selectable. Instead, a fixed, predefined value may be used. $T_2$ may be greater than or equal to $T_1$. As another option, when a template threshold value is defined for each pattern template, the confidence threshold value $T_2$ may not be used.

In an operation 282, the plurality of neural network models are initialized with the features stored in operation 265. For example, the weight matrices and tensors learned during training in addition to the hyperparameters provided for training are used to reconstruct the trained plurality of neural network models.

In an operation 284, the initialized plurality of neural network models are executed with the pre-processed data from dataset 126 as an input to a first neural network of the initialized plurality of neural network models. The plurality of neural network models includes a deep learning layer and an interpretive layer.

When the deep learning layer includes a stacked, bi-directional RNN, a shape of the input data is grown to a much greater size by adding height, but maintaining a width as the number of data points to define, N, indicated in operation 203. For illustration, as an example implementation for a stacked, bi-directional RNN, two independent stacked RNNs are formed, one that runs forward, and one that runs backwards. The stacked RNNs have an RNN for each layer of the stack, and the output of one is fed as the input to the next. At the end, the final output for both the forward and backward RNNs are concatenated together to produce the final output of the stacked, bi-directional, RNN.

When the deep learning layer includes a convolutional network model, the pre-processed data from dataset 126 is passed through a few (e.g., three to ten) convolutional network layers so that each neuron can reference a few previous values and a few future values in the x-dimension when making decisions. After processing through the convolutional network model the data has the same width, but now has additional y-values for each x-value. Each additional y-value represents the output of one of the learned convolutional filters. The output of the first convolutional layer is passed into a subsequent layer, and so on.

For the interpretive layer of the plurality of neural network models, the data computed by the deep learning layer may be input to a one-way RNN using a gated recurrent unit cell. The number of layers of the one-way RNN may be determined by the final model selection of the deep learning layer. For example, if a convolutional network model provides input to the interpretive layer model, the one-way RNN may have four layers. A number of convolutional filters corresponds to a new output height of the data within the plurality of neural network models, and is not related to a number of the convolutional network models. The number of convolutional filters is functionally equivalent to the new height output by the bi-directional RNN, just like how the number of convolutional layers is equivalent to a number of stacked RNNs. The final one-way RNN's number of layers is independent of the other models.

The purpose of the interpretive layer is to interpret the output of the deep learning layer to make final conclusions and to convert the data to have output values for each of the number of data points to define, N, indicated in operation 203 for each pattern type of the number of pattern types indicated in operation 200. Higher output values indicate a higher likelihood that the pattern exists at that data point; whereas, lower output values indicate a lower likelihood that the pattern exists at that data point.

Figure 5:
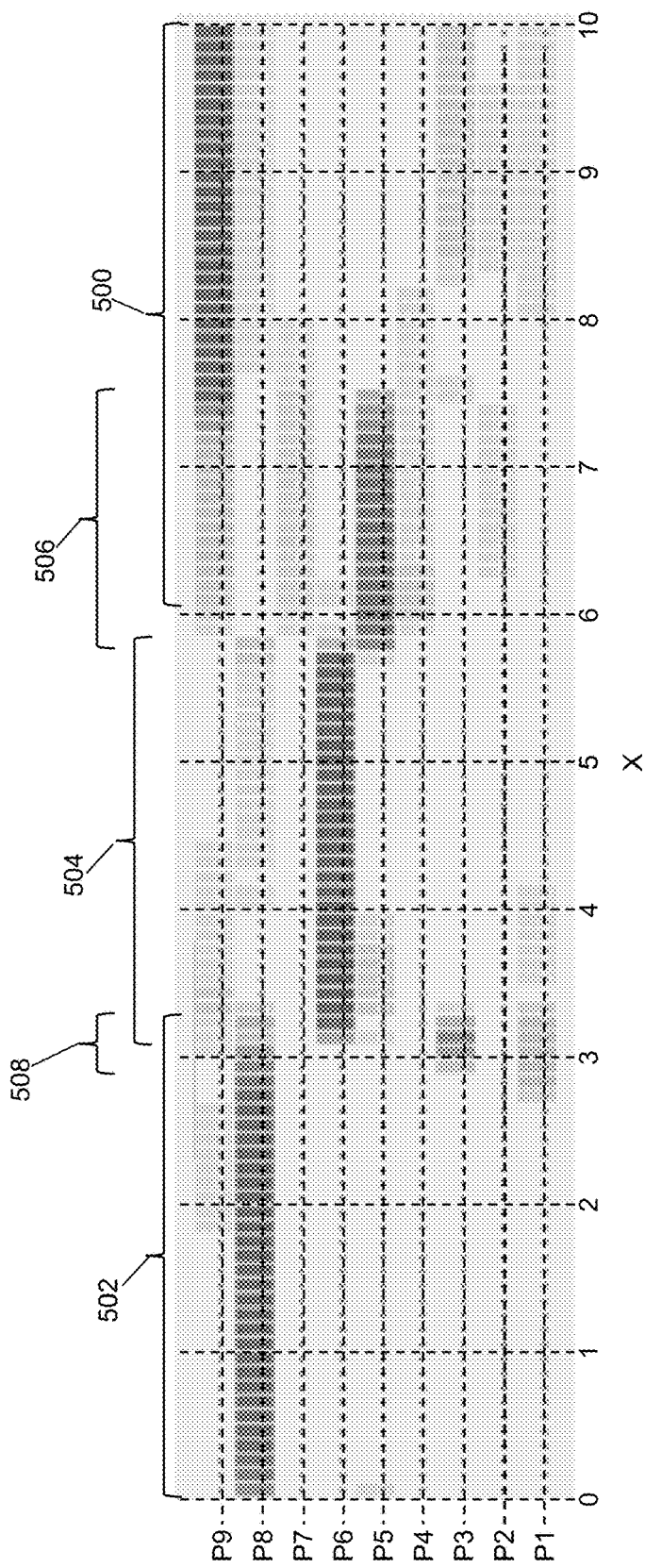
FIG. 5 depicts intervals during which a plurality of patterns was identified by the pattern identifier device of FIG. 1 in accordance with an illustrative embodiment.

Referring to FIG. 5, sample output values for nine different pattern types are shown for dataset curve 400 used as dataset 126. Pattern type P1 may be described as a "dip". Pattern type P2 may be described as a "spike". Pattern type P3 may be described as a "sudden increase". Pattern type P4 may be described as a "sudden drop". Pattern type P5 may be described as a "constant". Pattern type P6 may be described as an "exponential decrease". Pattern type P7 may be described as an "exponential increase". Pattern type P8 may be described as a "linear decrease". Pattern type P9 may be described as a "linear increase".

The shaded blocks visually describe the output value for each x-value for each pattern type. The darker the shading, the higher the output value, the lighter the shading or in the absence of shading, the lower the output value. Again, the output values indicate a likelihood that the associated pattern type exists at the x-value. As expected, a first interval 500 indicates occurrence of pattern type P9 ("linear increase") from ~7.5 to ~10; a second interval 502 indicates occurrence of pattern type P8 ("linear decrease") from ~0 to ~3; a third interval 504 indicates occurrence of pattern type P6 ("exponential decrease") from ~3.2 to ~5.8; a fourth interval 506 indicates occurrence of pattern type P5 ("constant") from ~5.8 to ~7.5; and a fifth interval 508 indicates occurrence of pattern type P3 ("sudden increase") from ~2.9 to ~3.3. The plurality of neural network models was trained to identify each of the nine different pattern types with noised training data representative of each pattern type as discussed previously. Zero or more of the nine different pattern types may be identified to occur at any x-value.

In an operation 286, a pattern type of the number of pattern types is selected. For example, for a first iteration of operation 286, pattern type P1 may be selected; for a second iteration of operation 286, pattern type P2 may be selected; for a third iteration of operation 286, pattern type P3 may be selected, etc. until each pattern type is processed.

In an operation 288, a neural network model output for the pattern type is selected. For example, for the first iteration of operation 288, the first row of output values illustrated for pattern type P1 in FIG. 5 are selected. The first row of output values includes the number of data points to define, N, indicated in operation 203.

In an operation 290, a start time, a stop time, and an average value may be determined for each output value $Y_d$ of the first row that is greater than or equal to the pattern window threshold value $T_1$. The output value $Y_d$ exceeding the pattern window threshold value $T_1$ indicates that the pattern is occurring in the pre-processed data from dataset 126. As the row of output values is scanned, the start time, the stop time, and a running sum are computed. The start time is identified when the output value first exceeds the pattern window threshold value $T_1$. The stop time is identified when the next output value no longer exceeds the pattern window threshold value $T_1$. The average value is computed using the running sum computed between the start time and the stop time based on the number of x-values between the start time and the stop time. A plurality of intervals may be defined for the selected pattern type. Of course, zero intervals may be defined for the selected pattern type if the criteria applied in operation 290 is not satisfied for the entire row of output values.

In an operation 292, a template is selected from the one or more pattern templates for the selected pattern type indicated in operation 286 when the computed average value $A_{pi}$ of an interval is greater than or equal to the confidence threshold value $T_2$. For example, the average value $A_{p1}$ computed for a first interval for the selected pattern type may not exceed $T_2$; whereas, the average value $A_{p2}$ computed for a second interval for the selected pattern type may exceed $T_2$. In this case, the first interval is ignored, but the template for the second interval is selected. When the template threshold value is defined for each pattern template, the template threshold value may be used instead of the confidence threshold value $T_2$ to select the template. In the template, the start time for the interval is substituted for $x_1$ and the stop time for the interval is substituted for $x_2$.

In an operation 294, the selected template with the substituted values for $x_1$ and $x_2$ is output to dataset pattern description 128. Of course, zero intervals may be defined for the selected pattern type if the criteria applied in operation 292 is not satisfied for the entire row of output values. Additionally, one or more intervals may be defined for the selected pattern type when the criteria applied in operation 292 is satisfied for a plurality of intervals in the row of output values. Instead of outputting the selected template, the pattern description may be output to dataset pattern description 128 in other forms for use by other tools. For example, the pattern description may be output using JavaScript Object Notation (JSON). Below is example JSON output for the illustration of FIG. 5:

```
[
    {
        "type":" linear increase ",
        "from":7.5,
        "to":10,
        "conf":0.67338153794415
    },
    {
        "type":" linear decrease ",
        "from":0,
        "to":3,
        "conf":0.7574747179339877
    }
    {
        "type":" exponential decrease ",
        "from":3.2,
        "to":5.8,
        "conf":0.8642357994555581
    }
    {
        "type":" constant ",
        "from":5.8,
        "to":7.5,
        "conf":0.6342597461397166
    }
    {
        "type":" sudden increase ",
        "from":2.9,
        "to":3.3,
        "conf":0.54259874613947166
    }
]
```

In an operation 296, a determination is made concerning whether or not there is another pattern type to process for pattern intervals. When there is another pattern type, processing continues in operation 286 to select and process the next pattern type. When there is not another pattern type, processing continues in operation 268 to process another dataset 126 if one is indicated or processing is done.

For illustration, output stored to dataset pattern description 128 may be used by a natural language processing system to audibly present the template results, for example, using speaker 118. The results further may be presented on display 116 or printer 120 to summarize the characteristics of dataset 126 to a user.

Pattern identifier application 122 uses deep learning and synthetic training data generation to classify nested and/or sequential patterns in data, such as time-series data. Pattern identifier application 122 further may use a combination of recurrent neural networks and/or convolutional neural networks to output what patterns are identified at every given data point.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   define a first plurality of data points, wherein each data point of the first plurality of data points includes an x-value and a y-value, wherein a single y-value is defined for each x-value of the first plurality of data points;
   execute a first trained neural network model using the first plurality of data points as input to input nodes of the first trained neural network model to generate first output node data from output nodes of the first trained neural network model;
   execute a second trained neural network model using the generated first output node data as input to input nodes of the second trained neural network model to generate second output node data from output nodes of the second trained neural network model, wherein the generated second output node data includes a plurality of output values for each x-value of the plurality of data points, wherein, for each x-value, an output value of the plurality of output values is associated with a single pattern type of a plurality of predefined pattern types; and
   for each pattern type of the plurality of predefined pattern types,
      identify a start time and a stop time when the output value for the associated pattern type exceeds a predefined pattern window threshold value; and
      when the start time and the stop time are identified, output the identified start time and stop time in association with the associated pattern type.

2. The non-transitory computer-readable medium of claim 1, wherein the x-value is a time value.

3. The non-transitory computer-readable medium of claim 1, wherein the first trained neural network model is a recurrent neural network model.

4. The non-transitory computer-readable medium of claim 1, wherein the first trained neural network model is a bi-directional, recurrent neural network model.

5. The non-transitory computer-readable medium of claim 1, wherein the first trained neural network model is a convolutional network model.

6. The non-transitory computer-readable medium of claim 1, wherein the first trained neural network model is a convolutional network model connected to a stacked, bi-directional, recurrent neural network model, wherein the first plurality of data points is input to input nodes of the convolutional network model that generates convolutional output node data from output nodes of the convolutional network model, and the generated convolutional output node data is input to input nodes of the stacked, bi-directional, recurrent neural network model that generates the first output node data from output nodes of the stacked, bi-directional, recurrent neural network model.

7. The non-transitory computer-readable medium of claim 6, wherein the second trained neural network model is a single layer, one-way recurrent neural network model.

8. The non-transitory computer-readable medium of claim 1, wherein the second trained neural network model is a single layer, one-way recurrent neural network model.

9. The non-transitory computer-readable medium of claim 1, wherein before outputting the identified start time and stop time, the computer-readable instructions further cause the computing device to:
compute an average value of output values between the identified start time and the identified stop time;
wherein the identified start time and the identified stop time are only output in association with the associated pattern type when the computed average value exceeds a predefined confidence threshold value.

10. The non-transitory computer-readable medium of claim 1, wherein defining the first plurality of data points comprises receiving an indicator of a dataset and reading the dataset to define the first plurality of data points.

11. The non-transitory computer-readable medium of claim 1, wherein defining the first plurality of data points comprises:
reading a first dataset that includes a second plurality of data points, wherein each data point of the second plurality of data points includes a second x-value and a second y-value, wherein a single second y-value is defined for each second x-value of the second plurality of data points; and
sampling the second plurality of data points to define the first plurality of data points, wherein a first number of the first plurality of data points is less than a second number of the second plurality of data points.

12. The non-transitory computer-readable medium of claim 1, wherein defining the first plurality of data points comprises:
reading a first dataset that includes a second plurality of data points, wherein each data point of the second plurality of data points includes a second x-value and a second y-value, wherein a single second y-value is defined for each second x-value of the second plurality of data points;
defining a sampling interval based on a maximum, second x-value, a minimum, second x-value, and a predefined number of data points; and
sampling the second plurality of data points at the defined sampling interval to define the first plurality of data points.

13. The non-transitory computer-readable medium of claim 1, wherein defining the first plurality of data points comprises:
reading a first dataset that includes a second plurality of data points, wherein each data point of the second plurality of data points includes a second x-value and a second y-value, wherein a single second y-value is defined for each second x-value of the second plurality of data points;
defining a sampling interval based on a maximum, second x-value, a minimum, second x-value, and a predefined number of data points;
sampling the second plurality of data points at the defined sampling interval; and
interpolating between the sampled second plurality of data points to define the first plurality of data points.

14. The non-transitory computer-readable medium of claim 1, wherein the computer-readable instructions further cause the computing device to:
receive a pattern template for each pattern type of the plurality of predefined pattern types, wherein the pattern template describes characteristics of the pattern type; and
select a received pattern template based on the associated pattern type, wherein the identified start time and stop time output in association with the associated pattern type are output using the selected pattern template to describe the associated pattern type.

15. The non-transitory computer-readable medium of claim 1, wherein the computer-readable instructions further cause the computing device to:
receive a pattern template and a template threshold value for each pattern type of the plurality of predefined pattern types, wherein the pattern template describes characteristics of the pattern type; and
select a received pattern template based on the associated pattern type and based on the output value for the associated pattern type exceeding the template threshold value, wherein the identified start time and stop time output in association with the associated pattern type are output using the selected pattern template to describe the associated pattern type.

16. The non-transitory computer-readable medium of claim 1, wherein before executing the first trained neural network model, the computer-readable instructions further cause the computing device to train the first trained neural network model connected to the second trained neural network model using a training dataset that includes a plurality of noised samples of each pattern type of the plurality of predefined pattern types.

17. A computing device comprising:
a processor; and
a non-transitory computer-readable medium operably coupled to the processor, the computer-readable medium having computer-readable instructions stored thereon that, when executed by the processor, cause the computing device to
define a first plurality of data points, wherein each data point of the first plurality of data points includes an x-value and a y-value, wherein a single y-value is defined for each x-value of the first plurality of data points;
execute a first trained neural network model using the first plurality of data points as input to input nodes of the first trained neural network model to generate first output node data from output nodes of the first trained neural network model;

execute a second trained neural network model using the generated first output node data as input to input nodes of the second trained neural network model to generate second output node data from output nodes of the second trained neural network model, wherein the generated second output node data includes a plurality of output values for each x-value of the plurality of data points, wherein, for each x-value, an output value of the plurality of output values is associated with a single pattern type of a plurality of predefined pattern types; and for each pattern type of the plurality of predefined pattern types, identify a start time and a stop time when the output value for the associated pattern type exceeds a predefined pattern window threshold value; and when the start time and the stop time are identified, output the identified start time and stop time in association with the associated pattern type.

18. A method of identifying a pattern in a dataset, the method comprising:

defining, by a computing device, a first plurality of data points, wherein each data point of the first plurality of data points includes an x-value and a y-value, wherein a single y-value is defined for each x-value of the first plurality of data points;

executing, by the computing device, a first trained neural network model using the first plurality of data points as input to input nodes of the first trained neural network model to generate first output node data from output nodes of the first trained neural network model;

executing, by the computing device, a second trained neural network model using the generated first output node data as input to input nodes of the second trained neural network model to generate second output node data from output nodes of the second trained neural network model, wherein the generated second output node data includes a plurality of output values for each x-value of the plurality of data points, wherein, for each x-value, an output value of the plurality of output values is associated with a single pattern type of a plurality of predefined pattern types; and for each pattern type of the plurality of predefined pattern types, identifying, by the computing device, a start time and a stop time when the output value for the associated pattern type exceeds a predefined pattern window threshold value; and when the start time and the stop time are identified, outputting, by the computing device, the identified start time and stop time in association with the associated pattern type.

19. The method of claim 18, wherein the first trained neural network model is a recurrent neural network model.

20. The method of claim 18, wherein the first trained neural network model is a bi-directional, recurrent neural network model.

21. The method of claim 18, wherein the first trained neural network model is a convolutional network model.

22. The method of claim 18, wherein the second trained neural network model is a single layer, one-way recurrent neural network model.

23. The method of claim 18, wherein, before outputting the identified start time and stop time, the method further comprises computing, by the computing device, an average value of output values between the identified start time and the identified stop time;

wherein the identified start time and the identified stop time are only output in association with the associated pattern type when the computed average value exceeds a predefined confidence threshold value.

24. The method of claim 18, wherein defining the first plurality of data points comprises receiving an indicator of a dataset and reading the dataset to define the first plurality of data points.

25. The method of claim 18, wherein defining the first plurality of data points comprises:

reading a first dataset that includes a second plurality of data points, wherein each data point of the second plurality of data points includes a second x-value and a second y-value, wherein a single second y-value is defined for each second x-value of the second plurality of data points; and sampling the second plurality of data points to define the first plurality of data points, wherein a first number of the first plurality of data points is less than a second number of the second plurality of data points.

26. The method of claim 18, wherein defining the first plurality of data points comprises:

reading a first dataset that includes a second plurality of data points, wherein each data point of the second plurality of data points includes a second x-value and a second y-value, wherein a single second y-value is defined for each second x-value of the second plurality of data points;

defining a sampling interval based on a maximum, second x-value, a minimum, second x-value, and a predefined number of data points; and sampling the second plurality of data points at the defined sampling interval to define the first plurality of data points.

27. The method of claim 18, wherein defining the first plurality of data points comprises:

reading a first dataset that includes a second plurality of data points, wherein each data point of the second plurality of data points includes a second x-value and a second y-value, wherein a single second y-value is defined for each second x-value of the second plurality of data points;

defining a sampling interval based on a maximum, second x-value, a minimum, second x-value, and a predefined number of data points;

sampling the second plurality of data points at the defined sampling interval; and interpolating between the sampled second plurality of data points to define the first plurality of data points.

28. The method of claim 18, further comprising:

receiving a pattern template for each pattern type of the plurality of predefined pattern types, wherein the pattern template describes characteristics of the pattern type; and selecting, by the computing device, a received pattern template based on the associated pattern type, wherein the identified start time and stop time output in association with the associated pattern type are output using the selected pattern template to describe the associated pattern type.

29. The method of claim 18, further comprising:

receiving a pattern template and a template threshold value for each pattern type of the plurality of predefined pattern types, wherein the pattern template describes characteristics of the pattern type; and selecting, by the computing device, a received pattern template based on the associated pattern type and based on the output value for the associated pattern type exceeding the template threshold value, wherein the identified start time and stop time output in association with the associated pattern type are output using the selected pattern template to describe the associated pattern type.

30. The method of claim 18, wherein before executing the first trained neural network model, the method further comprises training the first trained neural network model connected to the second trained neural network model using a training dataset that includes a plurality of noised samples of each pattern type of the plurality of predefined pattern types.

* * * * *

UNITED STATES PATENT AND TRADEMARK OFFICE
CERTIFICATE OF CORRECTION

PATENT NO. : 10,235,622 B2
APPLICATION NO. : 15/658566
DATED : March 19, 2019
INVENTOR(S) : Stuart Andrew Hunt et al.

It is certified that error appears in the above-identified patent and that said Letters Patent is hereby corrected as shown below:

In the Specification

Column 8, Lines 9-27:
Delete the paragraph "The equation defining each pattern type may be predefined or may be defined using pattern identifier application 122. For example, referring to FIG. 3, pattern identifier application 122 may present a user interface window in which a user can draw a curve 300 that represents a pattern type to add to training datasets 124 or otherwise store for use by pattern identifier application 122. Curve 300 may have any values as long as a single y-value is defined for each x-value of the first plurality of data points. For example, the x-value may represent a time value that is captured during a time window defined between $x_L$ and $x_U$. For example, a y-value may be defined for a predefined number of x-values periodically selected between $x_L$ and $x_U$ with the associated y-value read from curve 300. The x, y pair values defined between $x_L$ and $x_U$ define a first pattern type by fitting a curve to the x, y pair values. A plurality of pattern types may be defined in this manner with the user further selecting or entering an indicator of the pattern type in association with the fit curve.".

Column 10, Line 14:
Delete the phrase "0.1*random() which" and replace with --0.1*random(), which--.

Signed and Sealed this
Seventh Day of May, 2019

Andrei Iancu
*Director of the United States Patent and Trademark Office*